United States Patent Office 3,325,338
Patented June 13, 1967

3,325,338
COMPRESSED INTERBONDED HEAT-TREATED RETICULATED CELLIFORM MATERIAL AND METHOD OF MAKING SAME
Henry C. Geen, Ann Arbor, Mich., assignor to Chemotronics, Incorporated, Ann Arbor, Mich., a corporation of Michigan
No Drawing. Filed Oct. 17, 1963, Ser. No. 317,056
14 Claims. (Cl. 161—89)

This invention relates to a process for the preparation of novel compressed products, derived from isocyanate-derived polymer, reticulated celliform materials, having interbonded heat treated polymer strands and which are porous, flexible and have unique physical properties. More particularly this invention relates to a process whereby isocyanate-derived polymer, reticulated celliform materials, having heat treated polymer strands, are compressed and heated until the polymer strands are interbonded, thereby forming a novel compressed product.

Isocyanate-derived polymers are polymeric materials wherein residues of polyisocyanate compounds form a part of the polymer chain, the polyisocyanate residues acting as chain-extending and cross-linking agents to form ultimate polymer molecules of high molecular weight. The isocyanate-derived polymers are designated in accordance with the type of polymer chain forming the major portion of the ultimate polymer molecule, which may be a polyester, polyether, or the like; and in accordance with the nature of the bond derived from the isocyanate radical in the chain forming reaction, which may be a urethane bond, a urea bond, an amide bond, or other. Thus, an isocyanate-derived polymer may be a polymeric polyester polyurethane, a polymeric polyether polyurethane, and so forth.

By a celliform structure is herein meant a structure in which at least the outlines of a three-dimensional cellular structure are present and are defined by the polymer strands. The faces of the cells outlined by the polymer strands may be present or may be lacking. Celliform structures wherein most or all of the cell faces are present, in the form of sheets, membranes, or other obstructions to free passage in every direction between the cells are herein designated cellular structures or materials. When some or all of the cell membranes are removed, the celliform structure is herein designated as a reticulated structure or material.

Foamed cellular structures comprising isocyanate-derived polymers are well known. Generally in the production of isocyanate-derived polymer foams, terminal or unreacted isocyanate radicals in the polymer chain are caused to react to form carbon dioxide, whereupon the evolution and expansion of the carbon dioxide results in cellulation of the foamed polymer product; this may also be assisted by the incorporation of blowing agents in the liquid polymer, such as the volatile halogenated hydrocarbons (Freon (trademark) and the like) as is well known in the art.

Interconnected-cell, isocyanate-derived polymer cellular structures may be of very low density, as light as one pound per cubic foot or less. Depending on the molecular structure of the polymer, the foamed cellular materials range from rigid and board-like to soft and flexible. Flexible isocyanate-derived polymer foamed cellular structures are resilient, and essentially recover their original shape after deformation.

By various treatments, as will be described further hereinafter, isocyanate-derived polymer cellular structures may be converted to reticulated celliform structures, comprising a three-dimensional network of polymer strands defining the skeletal outline of the original cellular structure. The reticulated structures are generally softer and are much more porous or fluid-permeable than the corresponding cellular structures.

When an isocyanate-derived polymer having a cellular structure is heated and compressed, the product is essentially non-porous. Thus, this product is little different from a solid sheet of an isocyanate-derived polymer.

When a reticulated celliform structure produced by a well known prior art process is compressed and heated in an attempt to interbond the polymer strands, it is found that the bonds between the strands are so weak that the product is easily separated into essentially or substantially the original reticulated celliform structure. This prior art process for reticulating cellular structures relies upon direct chemical action in order to accomplish reticulation. The cell membranes are removed by hydrolysis, generally in an alkaline medium. As will be discussed more fully hereinafter, this prior art process affects the surface of the polymer strands such that they are not inherently interbonded without the aid of an added material, such as an adhesive.

The prior art has accomplished the compression setting of celliform materials, including reticulated celliform materials, as shown in Patent No. 3,025,200. In that case, the polymer strands are deformed, but not interbonded, by compression and then they are heat set into the compressed position in order to improve the compression/deflection characteristics of the celliform material. The process relied upon in that patent for reticulation of a cellular isocyanate-derived polymer material is the alkaline hydrolysis process discussed above and thus the unaided interbonding of the polymer strands can not in any event be satisfactorily accomplished by the method disclosed in that patent.

It is therefore an object of the present invention to provide novel compressed products, derived from reticulated, isocyanate-derived polymer materials which, without the aid of an added material, have strongly interbonded, heat treated polymer strands and which are porous, flexible and which have unique properties.

Further still, it is an object of the present invention to provide a process for the preparation of such compressed products.

These and other objects will become increasingly apparent to those skilled in the art as the description proceeds.

The objects of the present invention are accomplished by providing a novel article of manufacture which comprises a material with interbonded, heat treated polymer strands of a celliform, reticulated, isocyanate-derived polymer, the material being characterized in that it is flexible and porous. The preferred materials have the ability to wick water, as will be explained more fully. Further, the objects of the present invention are accomplished by laminating fabrics to the product or by introducing other materials into it such as by impregnating or coating it with various modifying materials to alter its behavior, thereby increasing the tensile strength, for example. Further still, the objects of the present invention are accomplished by providing a process for the preparation of such materials which comprises compressing a celliform, reticulated, isocyanate-derived polymer material having heat treated polymer strands until heated polymer strands are interbonded, thereby forming a compressed product, characterized in that it is flexible and porous. The preferred reticulated starting material is preferably reticulated by heat treatment.

The production of foamed, open or interconnected-cell cellular structures comprising isocyanate-derived polymers is well understood in the art. As noted above, the isocyanate-derived polymers comprise polymeric molecules linked by polyisocyanate residues, and are characterized by the nature of the bond to which the isocyanate radical is converted in the ultimate polymer chain, and by the nature of the polymer forming the major portion of the ultimate polymer chain. The initial polymeric molecule with which the polyisocyanate is reacted may be designated a secondary polymer.

One class of secondary polymers from which foamed isocyanate-derived polymer cellular structures may be produced comprises polyesters. The secondary polymer in this case is an alkyd resin or polymeric polyester prepared by reaction of a polyfunctional acid with a polyfunctional alcohol, such as adipic acid and ethylene glycol. Under such conditions there will be contained therein terminal groups having replaceable hydrogen atoms. Various modifications may be made in the polyester; for example, as a substitute for a portion of the polyfunctional alcohol, which is usually a dihydric alcohol such as glycol or a dihydric ether alcohol, there may be used a trifunctional alcohol such as glycerine. Usually excessive amounts of trifunctional and higher alcohols are avoided to obviate the possibility of excessive cross-linking within and gelling of the polyester. The polyfunctional acid employed is generally a straight chain aliphatic acid such as adipic acid, but may include an aromatic acid such as phthalic acid or an olefinic acid such as maleic acid. If the polyester contains an unsaturated acid, side chains can be introduced by addition polymerization to produce, for example, styrene-modified polyesters. Another variation in polyesters is produced by adding to the charge during the synthesis an oil, that is a triglyceride, which can enter into the polyester chain by transesterification. Advantageously, the oil may contain free hydroxyl groups, as exemplified by castor oil. It has been reported that polyesters can be prepared from lactones, in which reaction a single starting material acts in itself as both acid and alcohol in producing a polymeric polyester chain. Further variations and modifications in the synthesis of polyesters from which isocyanate-derived polymers may be prepared are well known in the art.

If, in the synthesis of the polyester, the polyfunctional acid is present somewhat in excess, on a molar basis, as compared to the polyfunctional alcohol, the resulting polyester contains terminal free acid groups. Reaction of isocyanate radicals with such carboxylic acid groups results in formation of amide bonds, with generation of foam-forming carbon dioxide as a by-product; by virtue of their polyfunctionality, the polyisocyanate residues function as bridges between the molecules of the polyester chains, and in the presence of suitable chain extending reagents, such as water, glycols and the like will even produce cross-linked, high molecular weight foamed polymeric structures.

Alcohol-terminated polyesters are also convertible to isocyanate-derived polymers, and hydroxyl-substituted polymers or polyols, such as polyesters containing free hydroxyl radicals, are the secondary polymers used to prepare an important class of isocyanate-derived polymers, the polyurethanes. The reaction by which isocyanate-derived polymers of the polyurethane type are prepared, involving the union of a hydroxy group with an isocyanate radical to form a urethane bond, is not productive of by product carbon dioxide, in contrast to the amide-forming condensation reaction described above. For foam production, an isocyanate-derived polymer of the polyurethane type may be treated, during or subsequent to reaction of the polyisocyanate with the secondary polymer or polyol, with a chain extending reagent, usually water, with which isocyanate radicals react to form carbon dioxide.

The polyol with which the polyisocyanate is reacted may be polyester, in which case the polymer obtained may be designated a polymeric polyester polyurethane. It is possible to prepare isocyanate-derived polymers from monomeric polyol polyesters of relatively high molecular weight, such as castor oil, the ultimate polyurethane product being a polymeric material.

Another class of polyols with which polyisocyanates may be reacted to form foamed open-cell cellular structures comprises polyethers. Illustrative of polyethers from which foamed cellular structures of polymeric polyether polyurethanes may be prepared are aliphatic alkylene glycol polymers, as exemplified by poly-1,4-butylene ether glycol. Additionally, polyether molecules may include the residues of a variety of compounds, such as amines and the like, which are reactive with alkylene oxides, from which latter compounds polyethers are prepared. Such modified polyethers may also be used for preparation of polyurethane cellular structures. In another variation, a polyether may be modified by reaction with an epoxy resin prior to or concurrently with the polyisocyanate reaction and production of a foamed cellular product. Procedural details and variations which may be made in selection of the nature of the polyether used, the polyisocyanate with which it is reacted, and so forth are well known in the art.

The preferred polyisocyanates for preparation of the presently useful polymers are aromatic diisocyanates, such as toluenediisocyanates, methylenediphenyldiisocyanates, p,p'-diphenyldiisocyanate, and so forth, but as is known, other polyisocyanates such as an aliphatic isocyanate like hexamethylene diisocyanate may be employed if desired.

In further extension of the scope and variety of isocyanate-derived polymer foamed cellular structures available, polyisocyanates may be reacted with any of a number of different polymers wherein functional groups reactive with isocyanate radicals are present, including polyesteramides, alcohol-modified urea-formaldehyde resins, and the like.

The pore size of cellular structures produced in isocyanate-derived polymer synthesis may be controlled as desired, by added foam-stabilizing or coalescing agents. The flexibility of the products may be varied by judicious selection of secondary polymer and isocyanate with respect to chain branching, steric hindrance of rotation and similar considerations.

The preparation of foamed isocyanate-derived polymer cellular structures is well understood in the art, and is described, for example, in "German Plastics Practice," published by Debell and Richardson, 1946, Chapter XXI; "Plastic Foams," pages 462–465; in "Papers Presented at the Atlantic City Meeting: Synthesis of Isicyanate Polymers," published by the Division of Paints, Plastics and Printing Ink Chemistry, American Chemical Society, 1956; and in the patent literature.

The isocyanate-derived polymer cellular structures of the prior art are preferably reticulated to form a reticulated celliform structure by heat treatment whereby the polymer strands are heat treated. Since the heat treatment of isocyanate-derived cellular materials to form reticulated, celliform structures is presently unknown to the prior art, an explanation is included in this description.

The term "heat treatment" is defined broadly to include the use of heat to reticulate, dewindow or remove the membranes, partially or completely, from an isocyanate-derived polymer cellular structure and whereby the polymer strands are heat treated. Within the scope of this definition are also the recitulated celliform materials which are subjected to heat treatment subsequent to reticulation whereby the polymer strands are heat treated. The term "heat treated" as used herein, means that the polymer strands defining the reticulated celliform structure have been exposed to a sufficiently high temperature for a sufficient length of time so that the product has significantly improved physical properties, such as tear and tensile strengths, when compared to untreated materials. In the preferred materials, reticulated by heat treatment, the reticulated product has a density which is comparable to the cellular material used as a starting material (about 2 percent density loss or less upon reticulation). These materials having a reticulated celliform structure of an isocyanate-derived polymer and having heat treated polymer stands are not dependent on any particular process for their manufacture.

Three basic processes for the reticulation by heat treatment of isocyanate-derived polymer materials having a cellular structure are disclosed in pending applications. A first process depends upon the use of a light pulse of sufficient intensity, such as that produced by a xenon containing flash discharge tube, which irradiates an isocyanate-derived cellular structure for a very brief period of time and selectively heats the membranes to the point where they are removed, leaving heat treated strands. The process is more fully described in application Ser. No. 263,603, filed Mar. 7, 1963 by Henry C. Geen, now U.S. Patent No. 3,175,030.

A second process is described in application Serial No. 271,031, filed Apr. 5, 1963 by Henry C. Geen and Warren A. Rice, now U.S. Patent No. 3,175,025, wherein the isocyanate derived polymer having a cellular structure is reticulated by heat treatment by providing a combustible mixture of gases in the cellular structure and igniting the combustible mixture. The reticulated product produced has heat treated polymer strands. A preferred combustible mixture is hydrogen and oxygen for instance. The process is preferably conducted in a closed rigid chamber. The products produced by this process are the preferred starting materials in the process of the present invention.

A third process is described in application Ser. No. 294,861, filed July 15, 1963 by Warren A. Rice wherein the isocyanate-derived polymer having a cellular structure is reticulated by heat treatment by rapid compression and decompression of a gas. In this process the gas such as air is instantaneously heated to a high temperature by the compression portion of the cycle which causes the cell membranes or windows to be opened. The reticulated material produced has heat treated polymer strands.

Other processes, where sufficient heat is applied to cause reticulation of the isocyanate-derived polymer cellular structures can be used, such as sufficiently thermally energetic reactions of materials disposed within the cellular structure as by photochemically induced decomposition of a gas such as nitrogen dioxide for example; however, the above disclosed processes for heat treatment are preferred.

The process of the present invention includes the compressing and heating of an isocyanate-derived polymer, reticulated celliform structure having heat treated polymer strands, such that the polymer stands are interbonded. The term "interbonded" as used herein means that the polymer strands are so strongly bonded at their points of intersection that they cannot be separated without significantly damaging the strands. This term does not include the simple compression setting of the polymer strands as shown in Patent No. 3,025,200 or the weak adhesion of the polymer strands in compressed and heated products produced from products produced by the prior art process relying upon hydrolysis for reticulation, which can have their strands quickly and easily separated without significantly damaging them, such as by exposing the finished product to low pressure steam.

The heating and compressing of the reticulated isocyanate-derived polymer material can be accomplished by various means. Thus, for example, the material can be heated with hot air and then compressed between hot or cold rolls spaced to the desired thickness, such that the polymer strands are interbonded. Alternatively, the reticulated material can be compressed between heated and spaced rolls without additional heating. Still another alternative is to simultaneously compress and heat the material between platens, usually provided with a stop so as to regulate thickness. Particular means of compression and heating are well known to the prior art and any variation in the compressing and heating means is within the scope of the present invention.

The temperature to which the isocyanate-derived polymer celliform reticulated material is heated depends to a certain extent upon the nature and composition of the polymer and the polymer strands. In general, the temperature involved is at or near the softening point of at least the polymer strands. For a conventional polyurethane resin this temperature ranges between approximately 300° F.–450° F.; however, there are variations even as between samples from the same batch.

The temperatures utilized in the compression affect the length of time of compression to produce the product. Thus, at higher temperatures the compression will be for a shorter duration in order to cause the interbonding of the strands than at lower temperatures. The time-temperature relationship is easily adjusted depending upon the particular isocyanate-derived polymer, reticulated material used and the selection is easily within the skill of the art.

Having generally described the process of the present invention, the following examples and description are more specifically illustrative but are not intended to limit the present invention. It is to be noted that in the following examples and description, the terms "gas permeable" or "permeable to the passage of gas" mean that air at ambient conditions will flow through the sample in the direction of the compression after the sample has been compressed and when an air pressure drop of not more than about 25 centimeters of water is placed across the sample.

EXAMPLE I

A flexible, black colored, polyester polyurethane sample, reticulated by gaseous combustion, was provided. The sample measured 4 inches by 4 inches by 1.43 inches and contained about 60 cells per linear inch and had a density of about 1.9 pounds per cubic foot.

A pair of moveable platens, heated electrically, the temperature being thermostatically controlled, were provided such that they were essentially parallel to each other and such that they were positioned in alignment in the direction of compression. A stop, 0.068 inch high, was provided on one of the platens so that the movement of the platens relative to each other in compression was limited. In starting position the platens were separated sufficiently to allow the sample to be positioned in between them.

The platens were heated to a temperature of about 350° F. Thin aluminum sheets were placed on the opposing sides of the sample that were to be normal to the direction of compression in order to prevent direct contact with the heated platens. The sample and thin aluminum sheets were positioned between the heated platens and compressed and held to a thickness of about 0.068" for about five minutes. The sample was compressed in a ratio of 22:1, original thickness to final thickness and measured 4 inches by 4 inches by 0.068 inch thick after being compressed.

After the compression step was completed, the product was removed, allowed to cool and examined. It was found that the polymer strands were strongly interbonded and could not be separated either mechanically or by soaking in various solvents or by exposing to low pressure steam and could be separated only by destruction through application of sufficient force to tear or split the sheet. It was further found that the product was permeable to gas passage and very strong. The product was flexible and elastic.

EXAMPLE II

The process of Example I was repeated except that a sample reticulated by the alkaline hydrolysis process and identical in all other respects was used.

It was found that the polymer strands were loosely bonded and that the product could easily be pulled apart without significant damage to its polymer strands. The product demonstrated only a slight adhesion of the polymer strands and the strands spontaneously separated when the product was exposed to low pressure steam.

EXAMPLE III

The process of Example I was repeated using the reticulated polyurethane material of Example II, reticulated by the alkaline hydrolysis method, except that the sample was additionally subjected to heat treatment by the aforementioned combustion process before being compressed by the process of the present invention.

It was found that the product had polymer strands which were much more strongly bonded than in Example II, but not as well as in Example I. The material was permeable to gas passage, flexible, elastic and strong.

EXAMPLE IV

The process of Example I was repeated, except that a nylon fabric was interposed on one opposing surface of the sample between one of the thin sheets of aluminum and the sample.

After compression the nylon fabric was easily removed from the surface of the product. It was found that the side of the product in contact with the nylon fabric faithfully reproduced in intaglio the pattern of the strands in the nylon fabric. The product was permeable to gas passage, strong, flexible and elastic.

EXAMPLE V

The process of Example I was repeated using an unreticulated polyester polyurethane sample which was otherwise identical to the sample of Example I.

When the compressed product was examined it was found that it was not permeable to gas passage and was relatively stiffer than the product of Example I. The product could not be separated to form the starting sample, indicating firm interbonding of the polymer strands as well as the cell membranes into an essentially solid mass.

EXAMPLE VI

The process of Example I was repeated using an identical sample except that nylon yarn was woven through the sample with a 1/8 inch mesh weave normal to the direction of compression, prior to compression.

After compression the sample was examined and it was found that the interbonded polymer strands could not be separated. The product was permeable to gas passage and relatively less elastic and relatively stronger than the product of Example I.

EXAMPLE VII

The process of Example I was repeated except that a knit cotton fabric was coated with a catalyzed polyurethane elastomeric adhesive mixture in acetone and the acetone was allowed to evaporate. The sample was split in half in a plane normal to the direction of compression and the coated cotton was positioned between the halves to form a laminate and the laminate was then compressed.

After compression, the sample was examined and it was found that the knit cotton fabric was strongly bonded to the compressed reticulated polyurethane material, which had firmly interbonded polymer strands. The product was gas permeable and less elastic and relatively stronger than the product of Example I.

EXAMPLE VIII

The process of Example I was repeated except that the compressed product produced in this example was impregnated with a composition consisting of an alcohol-soluble nylon dissolved in a warm 1:1 methanol-methylene chloride solvent mixture (10 parts by weight nylon per 100 parts by weight of solvent) and allowed to dry.

It was found that the nylon coating was strongly bonded to the celliform structure of the polyurethane. The product was flexible, elastic, permeable to gas passage and relatively stronger than the product of Example I.

EXAMPLE IX

The process of Example I was repeated except that a prepolymer polyether polyurethane sample containing cells ranging between 0.1 and 0.01 inch in diameter was used.

It was found that the product was essentially comparable to that of Example I in all respects.

EXAMPLE X

The process of Example I was repeated except that a one-shot polyether polyurethane sample was used.

It was found that the product was essentially comparable to that of Example I in all respects.

EXAMPLE XI

The process of Example I was repeated except that a sample containing about 10 cells per linear inch was used.

It was found that the product was comparable to that produced in Example I except that it was much more gas permeable.

EXAMPLE XII

The process of Example I was repeated except that a sample containing about 20 cells per linear inch was used.

It was found that the product was comparable to that produced in Example I except that it was more gas permeable.

EXAMPLE XIII

The process of Example I was repeated except that a sample containing about 80 cells per linear inch was used.

It was found that the product was comparable to that produced in Example I, except that it was less gas permeable.

EXAMPLE XIV

The process of Example I was repeated except that a sample containing about 100 cells per linear inch was used.

It was found that the product was comparable to that produced in Example I, except that it was relatively less permeable to gas passage.

As can be seen from the foregoing Examples I–XIV, thin aluminum sheets were used between the heated platens and the sample. This was done to protect the platens from contamination and keep them from sticking to the sample. It will be appreciated that there are numerous materials that can withstand high temperatures for example, Mylar$_{T.M.}$ polyester film or a release agent such as polydimethyl siloxane fluid.

As can be seen from Example IV, the surface of the compressed material can be given any sort of design merely by using a plate or material with the reverse of the design on it and pressing it against a surface of the compressed product. Choice of design or the means for creating it is within the skill of the art and is included within the scope of the present invention.

As can be seen from Example VII, various fabrics can be laminated to the compressed material by the use of an adhesive during or after the production of the compressed products. The advantage gained is that the tensile strength of the laminate compressed product is increased and further a non-simulated fabric surface may be imparted to the product. Variations in laminating materials and adhesives is within the skill of the art and contemplated within the scope of the present invention.

As can be seen in Example VIII, the compressed material can contain various modifying materials, such as the nylon impregnant used in this example, to increase the tensile strength of the compressed material and to impart surface characteristics consistant with the modifying material. These materials are introduced into or onto the reticulated celliform material after compression. Variations in modifying materials is within the skill of the art and is contemplated within the scope of the present invention.

As can be seen from Example VI the reinforcing fibers can be incorporated into the compressed product in order to increase the tensile strength of the product. In this example, nylon fibers were woven through the reticulated celliform material before compressing and heating to produce the product. The fiber used must be able to withstand the temperatures of the compression step. Variations in fibers is within the skill of the art and is within the scope of the present invention.

As can be seen from Examples XI–XIV, the pore size of the reticulated celliform material can be varied and thus the porosity or permeability of the compressed product can be controlled. If a large cell reticulated celliform material is used then the compressed product will be relatively more porous or permeable to gas passage than that produced using a smaller cell reticulated celliform material. Any port size in a reticulated celliform material can be used.

As can be seen from the foregoing examples, both polyester and polyether polyurethane reticulated celliform materials can be used. Generally, the polyether polyurethane materials are preferred as they are less costly than the polyesters, as a rule. However any isocyanate-derived polymer, reticulated celliform material can be used and they are included within the scope of the present invention.

In Examples I–XIV, the temperature was maintained at about 350° F. and the sample were compressed and heated for about 5 minutes. The reason for the uniformity in process conditions was to insure that the compressed products produced were uniform in this respect. Table I presents data on compressed products which were compressed and heated at different temperatures and for different lengths of time. The sample were compressed in a ratio of 22:1 such that the final sample thickness was 0.065 inch, using the equipment and procedure of Example I. The sample were reticulated by the preferred combustion process previously discussed.

TABLE I

| Temperature | Time (seconds) | Polyester Polyurethane Tensile Strength (pounds/square inch)[1] | |
|---|---|---|---|
| | | 60 cells/ linear inch | 80 cells/ linear inch |
| 300° F | 15 | No bonding | No bonding |
| | 30 | [2] 576 | [2] 640 |
| | 60 | [2] 576 | [2] 705 |
| | 120 | 512 | 832 |
| | 300 | 576 | 705 |
| 325° F | 15 | 576 | 960 |
| | 30 | 640 | 770 |
| | 60 | 512 | 896 |
| | 120 | 576 | 640 |
| | 300 | 576 | 640 |
| 350° F | 15 | 705 | [2] 770 |
| | 30 | 640 | 896 |
| | 60 | 640 | 770 |
| | 120 | 640 | 896 |
| | 300 | 512 | 640 |
| 370° F | 15 | 576 | 770 |
| | 30 | 640 | 705 |
| | 60 | 640 | 705 |
| | 120 | 640 | 640 |
| | 300 | 640 | 640 |
| 400° F | 15 | 576 | 705 |
| | 30 | 640 | 834 |
| | 60 | 576 | 705 |
| | 120 | 640 | 770 |
| | 300 | 640 | 705 |
| 425° F | 15 | 640 | 640 |
| | 30 | 640 | 705 |
| | 60 | 640 | 770 |
| | 120 | 640 | 705 |
| | 300 | 576 | 576 |

[1] Determined by applying a load to a spring-loaded balance attached to a specimen at one end with the specimen held in fixed position at the other end. The tensile strength was the load, at the breaking point, divided by the cross sectional area of the specimen.
[2] During tensile testing the sample came apart, indicating that the polymer strands were very poorly bonded together.

As can be seen from Table I, optimum conditions with regard to the tensile strength of the product appear to be at about 350° F. for 1.5 minutes. It was found that the tensile strength decreases where the sample is heated too long and/or at too high a temperature. It will be appreciated that longer or shorter periods of time, with varying temperatures can be used in order to interbond the polymer strands. The temperatures can be varied over wide ranges depending upon the isocyanate-derived polymer, reticulated celliform material which is used as a starting material. All of these variations are within the skill of the art and are contemplated within the scope of the present invention.

As can be seen from Examples I–XIV, the final product was compressed in a ratio of 22:1, initial thickness to final thickness. Again, this was done to insure that the compressed products produced were uniform in this respect. Table II presents data on samples which were compressed for five minutes at 350° F. for varying compression ratios. Using the equipment and procedure of Example I, the samples were compressed to varying degrees by changing the thickness of the starting reticulated material and then compressing and heating the sample to a thickness of 0.068 inch as before.

TABLE II

| Cell Size (pores per linear inch) | Compression Ratio (initial thickness/final thickness) | Tensile Strength* (pounds/sq. inch) |
|---|---|---|
| 20 | 16:1 | 320 |
| 20 | 22:1 | 512 |
| 20 | 32:1 | 705 |
| 20 | 40:1 | 1,340 |

*See footnote 1, Table I.

As can be seen from Table II, as the compression ratio increases so does the tensile strength of the compressed product. Selection of the appropriate compression ratio will depend on the porosity or gas permeability necessary in the compressed product; these decrease as the compression ratio is increased.

It will be appreciated that the thickness of the compressed product will depend upon the thickness of the reticulated celliform material used initially as well as the extent of compression. The extent of compression need only be sufficient to interbond the polymer strands to be within the scope of the present invention; however, the end use will dictate the extent of compression and the thickness of the compressed product in most instances.

As can be seen from Example V, when an unreticulated cellular material is compressed the product is non-porous and non-permeable to gas passage. As will be discussed hereinafter more fully, porosity or gas permeability is of prime importance in various garment and footwear applications where the porous and gas permeable compressed products of the present invention are particularly useful.

As can be seen from Example II, the product produced from a reticulated celliform material produced by the alkaline hydrolysis process has polymer strands which are only weakly adhered to each other even though the identical conditions of the process of the present invention were used. It was found that this was a general characteristic of reticulated celliform materials produced by this process.

It was found, as can be seen from Example IV, that if the prior art materials, reticulated by the alkaline hydrolysis process, were subjected to heat treatment, for instance by the preferred combustion process, such that the polymer strands were heat treated, that a compressed product was produced which was comparable to that produced when the reticulation was initially accomplished by heat treatment. However, as will be seen hereafter, when these materials were used to produce compressed products, the products produced were lacking in one important property, i.e. water wicking ability, as will be discussed further hereinafter, and thus are not preferred.

It was found that the compressed products of the present invention could be impregnated with liquid materials after they had been compressed according to the process of the present invention. For example, it was found that when molten paraffin was poured onto one side of a product produced by the process of Example I, it immediately penetrated through this material. Thus, another method of reinforcing or modifying the products of the present invention is to impregnate the compressed product with liquid reinforcing agents, such as polymer solutions or dispersions, molten solids, polymerizable liquids and the like. When this method of reinforcing or modifying the product is used, the product may be stretched in one or more directions during or after the time the impregnant has solidified by cooling, drying, coagulation, polymerization, curing, precipitation and the like, in order to impart a degree of porosity or permeability to gases or liquids, by disturbing or destroying the adhesion between the impregnant and the compressed product.

Although various means of post-modifying the reticulated celliform material have been described herein, it should be appreciated that modification can be accomplished before reticulation by incorporating modifying materials within the isocyanate-derived polymer before or during the course of the formation of the isocyanate-derived celliform material, such as by adding reinforcing fillers or fibers to the reactants during or before their combination to form the cellular material, or by judiciously selecting or causing chain extensions, cross-linkings or varying chemical bonds of one nature or another by proper selection of polymer components, reactants and/or reaction conditions.

The compressed products of Examples I–XIV were subjected to various tests to determine their properties. The results of this testing are set forth in Table III along with the results of testing on comparative materials.

where
$V$ = Volume of air passed through sample.
$T$ = Thickness of the sample.
$t$ = Time to collect V.
$T$ = Thickness of the sample.
$P$ = Pressure drop across sample.
$A$ = Area of sample.
$Kp$ = Permeability constant.

(3)
$$\frac{\text{Weight water absorbed}}{\text{Original weight of product}} \times 100 = \text{Percent Water Absorbed}$$

The sample was submerged in water for one hour at room temperature.

(4) Samples measuring ½ inch x 4 inches x 0.065 inch were positioned vertically in water in a dish. One-half inch of the sample was submerged. Exactly ½ inch above the water level a line was drawn across the specimen and another line was then drawn ¼ inch above the first line. The time to travel the ¼ inch distance was measured in seconds.

(5) The abrasion resistance is measured in grams of material lost when the sample is contacted under ASTM standard conditions in a Taber Abraser with H–22 wheels under a 1 kilogram load for 200 revolutions.

(6) Water vapor permeability was determined by the method set forth in the "Journal of American Leather Chemists Association," Volume 45, pages 211–242 (April 1950). A permeability cell was constructed by placing 10 grams of anhydrous calcium chloride in an aluminum cup and inverting the cup over a compressed sample somewhat larger in diameter than the diameter of the cup. A dam was provided around the outside of the sample and then a sealer (Eoplene C–10$_{T.M.}$, Eastman Chemical Products, Inc. polyethylene) was melted and heated to 160°–170° C. and poured between the dam and cup and onto one side of the sample.

TABLE III

| Compressed Product Tested | (1) Tensile strength (pounds/sq. in.) | (2) Air permeability (Kp) | (3) Water absorbed (percent by weight) | (4) Speed Water Wicking (in./min.) | (5) Abrasion Resistance (grams) | (6) Water Vapor Permeability (grams/cm.²/sec.) |
|---|---|---|---|---|---|---|
| Example I | 641 | 0.026 | 36 | 0.29 | 0.11 | |
| Example II | 472 | 0.042 | 44 | ~0.00 | (4) | |
| Example III | 485 | 0.064 | 43 | <0.05 | 0.68 | |
| Example IV | 641 | 0.026 | 36 | 0.29 | 0.11 | |
| Example V | 665 | ~0.000 | 9 | 0.00 | 0.29 | |
| Example VI | 1,320 | 0.007 | 31 | 0.29 | 0.11 | |
| Example VII | 1,100 | 0.026 | 32 | <0.05 | 0.11 | |
| Example VIII | 1,080 | 0.027 | 22 | <0.05 | | 0.364×10⁻⁶ |
| Example IX | ¹ 658 | 0.017 | 12 | <0.05 | | 0.977×10⁻⁶ |
| Example X | 778 | 0.039 | 43 | <0.05 | | 1.41×10⁻⁶ |
| Example XI | 478 | ² 3.6 | 35 | (³) | | 1.51×10⁻⁶ |
| Example XII | 598 | ² 2.0 | 34 | <0.05 | | 1.1×10⁻⁶ |
| Example XIII | 718 | 0.029 | 41 | <0.05 | | 1.39×10⁻⁶ |
| Example XIV | 718 | 0.014 | 38 | <0.05 | | 1.27×10⁻⁶ |

¹ The sample came apart during tensile testing.
² These values, although truly illustrating high air permeability, are not completely reliable because the air flow rate was extremely high for the apparatus.
³ Indeterminable.
⁴ Polymer strands became unbonded, test had to be stopped.

*Table III—Notes*

(1) Tensile Strength—The samples were ¼ inch wide. The instrument used was a Tinius-Olsen Tensilometer run at a cross-head speed of 14 inches per minute.

(2) Air was supplied on one side of the sample being tested, which acted as a diaphragm in a chamber. The pressure drop across the sample was measured with a water manometer. The air permeability was calculated by using the following equation:

$$Kp = \frac{VT}{tPA} = \frac{\text{in.}^3 \times \text{in.}}{\text{sec.} \times \text{in.} \text{H}_2\text{O}} \times \text{in.}^2$$

The completed permeability cell was weighed and then placed into a closed cabinet provided with a fan and a saturated aqueous solution of sodium chloride was also placed in the cabinet in order to create and maintain a constant humidity.

The cells were removed from the cabinet each hour during the test and weighed. The weight was plotted on a graph versus time and when the slope of a line drawn between the points became constant, the slope of this line was determined in grams per unit time. This slope divided by the area of the sample contained by the cup resulted in the water vapor permeability in grams per unit time-area.

As can be seen from Table III, the tensile strengths of the compressed products are high (Examples I, IV, and IX–XIV). They are comparable to the unreticulated material (Example V) when compressed even though the former is gas permeable. While the tensile strength of the compressed product, reticulated by alkaline hydrolysis (Example II), is fairly high, it can be seen that the strands became unbonded and the sample came apart when subjected to the abrasion resistance test. The tensile strength of the compressed product reticulated by the alkaline hydrolysis method and then subjected to the combustion process to heat treat the polymer strands (Example III) was somewhat reduced, but the sample did not come apart when subjected to the abrasion test. The compressed product with nylon fibers woven through it (Example VI) had a tensile strength which was about twice as great as that of Example I. When fabrics were laminated to the compressed product (Example VII) or modifying materials such as nylon were impregnated into the product (Example VIII), the tensile strengths were materially increased. This indicates that modification or reinforcement is useful in improving the tensile strength of the compressed products.

Another means of increasing the tensile strength of the compressed products was to stretch the reticulated celliform material before compressing and heating. Unexpectedly, it was found that the tensile strength of the products produced was significantly increased. In Table IV, the test results are set forth for one polyether polyurethane sample and one polyester polyurethane sample. The samples were stretched 100% in one direction and then compressed and heated using the procedure and equipment of Example I.

and will vary with the porosity of the reticulated material used initially, with the degree of compression (compression ratio), and the extent of reinforcement, lamination or modification of the compressed product with various materials. Thus the compressed products of the present invention are porous.

The percent water absorbed gives an indication of the capacity of the compressed products to hold water as it is being transpired from one surface to the other. It can be seen from Example V that the compressed unreticulated material is very poor in this respect by comparison to the other materials as shown in Table III.

A most important property, particularly in garment and footwear applications, is that the preferred materials of the present invention are water wicking. This is a measure of the ability of the compressed products to transfer water from one part of the material to another. In garment and footwear applications it is very important that the material have the ability to transfer perspiration from the surface of the skin to the outside of the material where it can evaporate. The ability to wick water contributes very materially to the comfort of the wearer in garment and footwear applications.

As can be seen from Examples I, IV and VI, the preferred materials of the present invention have a very good ability to wick water. This is a very unexpected finding. These are the materials which are reticulated by heat treatment especially by the preferred combustion process. By comparison to the compressed products in Examples II, III and V the wicking ability of the preferred materials is much greater. It has been found that the preferred materials of the present invention have a greater wicking ability than standard elkhide leather. Thus the preferred

TABLE IV

| | (1) Tensile Strength (pounds/sq. in.) | (2) Water Vapor Permeability | (3) Dry Sample Air Permeability (Kp) | (4) Wet Sample Air Permeability (Kp) |
|---|---|---|---|---|
| One shot polyether polyurethane: | | | | |
| (a) Unstretched | 780 | $1.39 \times 10^{-6}$ | $2.82 \times 10^{-2}$ | $7.30 \times 10^{-5}$ |
| (b) Stretched | 1,500 | $1.41 \times 10^{-6}$ | $1.29 \times 10^{-2}$ | $1.85 \times 10^{-5}$ |
| Polyester polyurethane, 80 cells per linear inch: | | | | |
| (a) Unstretched | 720 | $1.06 \times 10^{-6}$ | $3.55 \times 10^{-2}$ | $1.5 \times 10^{-6}$ |
| (b) Stretched | 1,130 | $0.97 \times 10^{-6}$ | $2.34 \times 10^{-2}$ | $1.5 \times 10^{-6}$ |
| Leather | 3,500 | $1.75 \times 10^{-6}$ | $1.85 \times 10^{-3}$ | $\cong 0.0$ |

(1) See footnote 1, Table I.
(2) See Table III, Column 6 note.
(3) See Table III, Column 5 note.
(4) Using the procedure set forth in Table I, Column 5 note, except that the samples were saturated with water by soaking before testing.

As can be seen from Table IV, the tensile strengths are materially increased by the use of stretching. The products are comparable to or better than leather in air and water vapor permeability, while lacking in tensile strength. By the use of various modifying or reinforcing techniques, as heretofore discussed, the tensile strengths can be increased to the point where they are about comparable with leather. Thus, the products of the present invention can in certain instances be used as leather substitutes.

One particularly important property of the products of the present invention is that they are air permeable when wet. The results of this kind of testing is shown in Table IV. Leather is nearly impermeable when wet, thus making shoes, for instance, uncomfortable when they are wet. The products of the present invention are thus better than leather in this respect.

The air permeability, percent water absorbed and speed of water wicking give some indication of the usefulness of the materials of the present invention in various applications including particularly garment and footwear applications. Air permeability is a measurement of porosity compressed products of the present invention can be very useful in footwear applications.

As can be seen from the abrasion resistance test, the compressed products of the present invention have a good resistance to abrasion. This property is important in applications where abrading contact of the compressed products is contemplated in use, such as in footwear applications.

Thus it can be seen that the compressed products of the present invention, formed from reticulated celliform materials having heat treated polymer strands and compressed and heated until the strands are interbonded, are very useful. They can be used in garment, footwear, filtering and many other applications where a porous, flexible product is required. The preferred compressed products formed from cellular materials reticulated by heat treatment are particularly useful in garment, medical and footwear applications because of their wicking ability.

It will be appreciated that both elastomeric and rigid isocyanate derived polymer, reticulated celliform materials can be compressed and heated by the process of the present invention to form the compressed products of the present invention. The compressed products in both cases are flexible, although the compressed products derived from rigid isocyanate-derived polymer, reticulated materials are relatively less flexible. The compressed products derived from the elastomeric isocyanate-derived polymer reticulated celliform materials are both flexible and elastic. These are the preferred compressed products.

It should be noted that in certain instances the compressed products of the present invention have a glossy or shiny surface. This is the result of heating and compressing the sample such that the surface polymer strands are flattened in a plane normal to the compression. Variations in surface charcteristics of the compressed product are easily obtained and are within the scope of the present invention.

It is intended that the foregoing description be only illustrative of the present invention and that this invention be limited only by the hereinafter appended claims.

I claim:

1. The process which comprises: compressing to intersect and simultaneously heating at elevated temperatures heat treated polymer strands of a reticulated celliform structure of isocyanate derived polymer, the polymer strands having been heat treated prior to compression at the temperature and for the length of time necessary for the removal of any membranes attached to the polymer strands, until the intersecting polymer strands are interbonded by the heating and form a flexible and porous compressed material wherein the interbonded polymer strands resist separation due to abrasion of the compressed material.

2. The process of claim 1 wherein reinforcing fibers are woven through the reticulated celliform structure prior to compressing.

3. The process of claim 1 wherein in addition a fabric is laminated to the surface of the compressed material.

4. The process of claim 1 wherein the isocyanate derived polymer is a flexible and elastic polyester polyurethane polymer.

5. The process of claim 1 wherein the isocyanate derived polymer is a flexible and elastic polyether polyurethane polymer.

6. The process of claim 1 wherein membranes were attached to the polymer strands which were removed as a result of being heat treated.

7. The process of claim 1 wherein in addition the compressed material is impregnated with a liquid reinforcing agent which solidifies and is stretched to modify the porosity of the compressed material with the reinforcing agent.

8. The product of the process of claim 1.

9. The product of the process of claim 1 wherein reinforcing fibers are woven through the compressed material.

10. The product of the process of claim 1 wherein a fabric is laminated to the surface of the compressed material.

11. The product of the process of claim 1 wherein the isocyanate derived polymer is a flexible and elastic polyester polyurethane polymer.

12. The product of the process of claim 1 wherein the isocyanate derived polymer is a flexible and elastic polyether polyurethan polymer.

13. The product of the process of claim 1 wherein membranes were attached to the polymer strands which were removed as a result of being heat treated.

14. The product of the process of claim 1 wherein in addition the compressed material is impregnated with a liquid reinforcing agent which solidifies and is stretched to modify the porosity of compressed material with the reinforcing agent.

References Cited

UNITED STATES PATENTS

| 3,025,200 | 3/1962 | Powers | 161—168 |
| 3,050,432 | 8/1962 | Weinbrenner et al. | 264—321 |

ALEXANDER WYMAN, *Primary Examiner.*

R. CRISS, *Assistant Examiner.*